Patented Sept. 3, 1929.

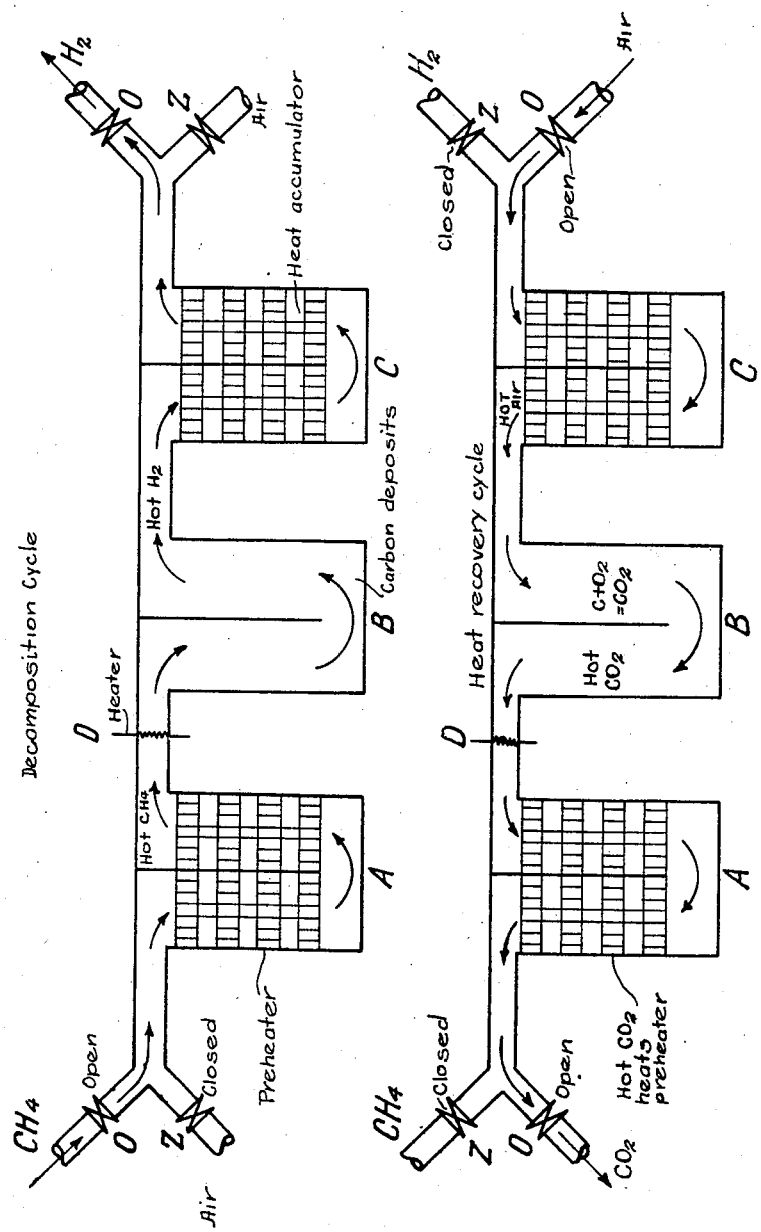

1,726,877

UNITED STATES PATENT OFFICE.

RUDOLF E. BATTIG, OF SODINGEN, GERMANY.

METHOD FOR GENERATING HYDROGEN.

Application filed May 18, 1927, Serial No. 192,447, and in Germany May 20, 1926.

Hydrocarbons are decomposed at high temperatures into their components i. e. carbon and hydrogen. Principally methane is used for the decomposition in question which naturally is found and generated in various chemical processes and is therefore an economic source of raw material.

In decomposing the hydrocarbons especially the methane at high temperatures, which action usually takes place in fireproof-clay- carbon- or iron-pipes, may disadvantages occur. During the decomposition the generated carbon accumulates in the pipes or surrounds the catalyst bodies, deteriorating the activity thereof or stopping it. Difficulties have arisen in so far, as all apparatus consisting of metal are very rapidly destroyed by the heat of the combustion gases and as they are influenced chemically by the decomposition of the carbon resulting from the methane gas. In order to render the method of producing hydrogen from hydrocarbons especially from methane-gas technically practical and to remove the above cited difficulties new methods for the decomposition had to be found.

In my invention, I avoid the difficulties hitherto encountered by constantly drawing off the carbon generated during the decomposition. The method may likewise be executed in such manner that the carbon is conveyed over or through coke, provided in a special chamber, and deposited at the outer and inner surfaces of the coke, as the coke itself does not lose its value, because it is likewise a mass containing carbon. In the same manner iron-ores may be used which will not be deteriorated by being mixed with the separated carbon, because in treating them for smelting processes in blast furnaces substances containing carbon must be added.

A device especially adapted for executing the present method is represented diagrammatically in cross-sections.

Figure 1 represents the path of the gases; and

Figure 2 the other path taken by the air alternately.

The execution of the method according to the present invention is effected in such a manner, that the hydrocarbons—principally are methane-gas—are introduced into a chamber A in which they are heated up to the temperature of decomposition by means of a hot lattice-like brick work inserted therein. By passing an additional heating apparatus D constructed in any well known manner the gases are heated up to the decomposition temperature and are decomposed. In a second chamber B suitably provided with an intermediate wall, the liberated carbon is eliminated, whereas the hydrogen passes on to a third chamber c likewise provided with a brick work and which takes up the heat given off by the hot hydrogen. The hydrogen is then conducted away to the point of use or stored in a gasometer.

After the heat has been taken up in the chamber C, air is introduced into the chamber C. The air is heated by the hot brickwork and enters the chamber B where it burns the separated particles of carbon to form carbon dioxide. The heat generated by such combustion, heats up the brick work in the chamber A, as the hot carbon dioxide passes through this chamber. Thereupon further quantities of methane are introduced into chamber A wherein they are heated and the process repeated. In this manner it is possible to decompose the hydrocarbons especially methane gas to the greatest degree into hydrogen and to store up in great quantities and to employ at the same time the reaction heat of the carbon, that combined with air and other gases containing oxygen affords a high combustion heat for the purpose of heating the chambers and so to develop the necessary heat together with an additional heating for maintaining the process.

In the drawing valves or slides O and Z are opened or closed in each state of the process.

In cases where the carbon is to be employed for the treating of ores, it is advantageously deposited on ore or coke introduced into the chamber B, in which case the heat necessary for the process, is furnished alone by a special additional heating. In such case the chamber C may serve as a heat accumulator, when the process begins at A. Alternately the chamber C and B are utilized for the process and the chamber A serves as the accumulator for heat, without heating by means of combustion air. A second additional heating apparatus is inserted for this purpose between the chambers B and C.

I claim:

1. A cyclic process for the generation of hydrogen by the decomposition of gaseous hydrocarbons, which comprise preheating the gaseous hydrocarbon to decomposition temperature in a preheater, passing the hot gases to a decomposing chamber wherein the carbon liberated during the decomposition is separated out of the gases, passing the hot hydrogen formed as a result of the decomposition into contact and heat exchange relationship with a heat accumulator and thence out of the system, stopping the flow of hydrocarbons, passing air through the heat accumulator to heat the air, reacting the hot air with the liberated carbon in the decomposing chamber to form carbon dioxide, passing the hot carbon dioxide gases so formed through the preheater to heat the same and thence out of the system, shutting off the supply of air, re-admitting further quantities of hydrocarbon gases to the preheater to be decomposed and repeating the cycle.

2. In the process of generating hydrogen by the decomposition of gaseous hydrocarbons, the steps which comprise preheating the gaseous hydrocarbons to decomposing temperature in a preheating zone and conducting the hot gases into a decomposition zone wherein carbon is continuously liberated from the products of decomposition during the passage of the gases.

3. A cyclic process for the generation of hydrogen by the decomposition of gaseous hydrocarbons, which comprise preheating the gaseous hydrocarbon to decomposition temperature in a preheater, passing the hot gases to a decomposing chamber containing coke wherein the carbon liberated during the decomposition is separated out of the gases, passing the hot hydrogen formed as a result of the decomposition into contact and heat exchange relationship with a heat accumulator and thence out of the system, stopping the flow of hydrocarbons, passing air through the heat accumulator to heat the air, reacting the hot air with the liberated carbon and coke in the decomposing chamber to form carbon dioxide, passing the hot carbon dioxide gases so formed through the preheater to heat the same and thence out of the system, shutting off the supply of air re-admitting further quantities of hydrocarbon gases to the preheater to be decomposed and repeating the cycle.

In testimony whereof I affix my signature.

RUDOLF E. BATTIG.